United States Patent Office 3,321,491
Patented May 23, 1967

3,321,491
PHOTOCHROMIC BENZOFURAN COMPOUNDS
Kenneth Robert Huffman and Edwin Fisher Ullman, Stamford, Conn., assignors to American Cyanamid Company, Stamford, Conn., a corporation of Maine
No Drawing. Filed Dec. 14, 1964, Ser. No. 418,294
6 Claims. (Cl. 260—346.2)

This invention relates to novel benzofuran compounds and to a process for preparing the same.

More particularly, this invention relates to novel benzofurans of the formula:

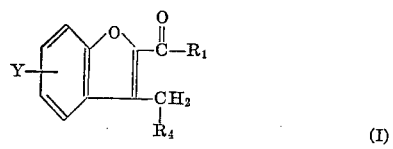

(I)

wherein $R_1$ and $R_4$ are selected from the group consisting of phenyl and substituted phenyl, said substituents for phenyl being selected from the group consisting of hydroxy, lower alkyl, lower alkoxy, lower alkyl thio, cyano, nitro, di(lower alkyl)amino, halogen and trifluoromethyl, and Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl. In the above formula $R_1$ and $R_4$ may be the same or different.

Compounds represented by generic formula (I) above are prepared by the cyclization of (o-hydroxyphenyl) benzyl ketones with the appropriate phenacyl derivative as follows:

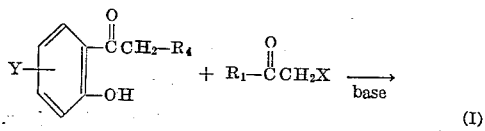

(I)

wherein Y, $R_1$ and $R_4$ are the same as set forth above and X is halogen such as bromine or chlorine, or any other suitable "leaving" group such as methyl sulfonoxy, p-toluene sulfonoxy and the like. By a "leaving" group is meant an element or radical which does not become a portion of product (I).

The reactants are known materials. Thus, for the preparation of a typical starting ketone, (o-hydroxyphenyl) benzyl ketone, there may be mentioned the methods of Chatteyea and Roy, J. Ind. Chem. Soc., 34, 155 (1957) or Farooq et al., Ber., 94, 1996 (1961).

In the process of preparing product (I), a salt of the ketone is first formed by the addition of a molecular equivalent of any moderately strong base such as alkali and alkaline earth metal hydroxides, e.g., potassium hydroxide, barium hydroxide, and the like; sodium ethoxide, sodium hydride, potassium t-butoxide, and the like. The salt formation step and subsequent treatment with phenacyl derivative is conveniently conducted in an inert organic solvent medium, preferably a polar solvent such as lower alkyl alcohols, e.g., ethanol, t-butyl alcohol; ethers, e.g., dioxane, tetrahydrofuran, dimethyoxyethane, dimethyl formamide; and the like. Salt formation is rapid and occurs at room temperature; hence, time of reaction and temperature is not critical and the phenacyl derivative reactant may be added to the reaction mixture substantially immediately after the base or even simultaneously therewith.

About a molecular equivalent of phenacyl derivative is employed; no particular advantage is gained by an excess of any reactant. The reaction is conveniently conducted at 0° C. to 200° C. or reflux temperature for from about 30 minutes to several hours, the particular temperatures and reaction times being a matter of choice depending on reactants and solvent medium.

Conventional separation and purification procedures are employed to isolate product (I) and include filtration, evaporation, solvent extraction, crystallization and the like.

The procedures described above may be run at atmospheric, subatmospheric or superatmospheric pressure. Likewise, the procedures may be batch, semi-continuous or continuous and the sequence of addition of the reactants to one another is not critical.

The novel compounds of this invention exhibit photochromism and are therefore useful alone or in combination with other materials in any system benefiting from said photochromism. Thus, among numerous and varied applications may be mentioned photochromic sunglasses, variable transparency windows, novelty jewelry and toys, memory devices, photography, photocopying, optical masks, photochromic printing paper, and the like.

The compounds may be used alone in the solid phase or in solution. Furthermore, they may be incorporated as a dispersed solid or as a solution in plastic moldings, castings, films or coatings on a wide variety of substrates including glass, paper, wood and the like.

Films containing the compounds of this invention are particularly useful. For example, the compound may be dissolved in a suitable solvent such as benzene or acetone and the like, and a solution prepared containing the photochromic compound and a thermoplastic polymer, e.g., a 20% by weight solids solution, based on dry weight of additives, with polymethylmethacrylate (95% polymer and 5% photochromic compound). This solution is then spread on a polyester film in a conventional manner and the thus-coated plastic used as optical masks, memory tapes, etc.

A particular advantage of the instant compounds is that they exhibit photochromic activity at low temperatures and are therefore useful in devices wherein lower temperatures are encountered.

The instant compounds are useful also as starting materials in the preparation of some of the novel photochromic cyclohexadiene compounds of copending case Ser. No. 418,337 filed Dec. 14, 1964 which is incorporated herein by reference.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

*Preparation of 2-benzoyl-3-benzylbenzofuran*

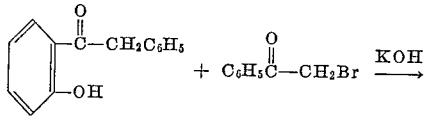

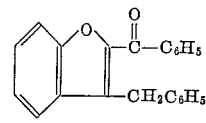

A solution of 1.0 gram (0.0047 mole) of (o-hydroxyphenyl)benzyl ketone and 0.28 gram of potassium hydroxide (0.0050 mole) in 5 ml. of ethanol was treated with 0.95 gram (0.0047 mole) of phenacyl bromide and refluxed for 2.5 hours in a suitable reaction vessel. The cooled solution was diluted with water and the resulting oil was extracted into benzene. The dried extract was evaporated to an oil which was chromatographed using a column packed with neutral alumina. Elution with ether gave a solid which was recrystallized from hexane to yield 1.0 gram of the benzofuran, M.P. 91–92° C. Yield 68%.

*Analysis.*—Calc'd for $C_{22}H_{16}O_2$: C, 84.59; H, 5.16. Found: C, 84.45; H, 5.01.

EXAMPLES 2–17

Table I below summarizes conditions for preparation of other illustrative compounds of this invention, said preparations being substantially in accordance with that of Example 1.

droxy, lower alkyl, lower alkoxy, lower alkyl thio, cyano, nitro, di(lower alkyl)amino, halogen and trifluoromethyl, and Y is selected from the group consisting of hydrogen, hydroxy, lower alkyl, trifluoromethyl, lower alkoxy, lower alkyl thio, cyano, nitro, halogen, di(lower alkyl)amino, phenyl and lower alkyl-substituted phenyl.

2. 2-benzoyl-3-benzylbenzofuran.
3. 2-(p-dimethylaminobenzoyl)-3-benzylbenzo[b]furan.
4. 2-benzoyl-3-(p-dimethylaminobenzyl)benzo[b]furan.
5. 2-(p-cyanobenzoyl)-3-benzylbenzo[b]furan.
6. 6-dimethylamino-2-benzoyl-3-benzylbenzo[b]furan.

TABLE I

| Ex. No. | Y | $R_1$ | $R_4$ | X | Base | Temp., °C. | Solvent |
|---|---|---|---|---|---|---|---|
| 2 | 6-CH$_3$ | p-C$_6$H$_4$N(CH$_3$)$_2$ | p-C$_6$H$_4$N(CH$_3$)$_2$ | Br | KOH | 65 | CH$_3$OH. |
| 3 | 5-Br | o-C$_6$H$_4$CN | C$_6$H$_5$ | Cl | NaOH | 78 | C$_2$H$_5$OH. |
| 4 | 4-C$_6$H$_5$ | m-C$_6$H$_4$OH | o-C$_6$H$_4$CF$_3$ | Br | NaOC$_2$H$_5$ | 78 | C$_2$H$_5$OH. |
| 5 | 5-CN | p-C$_6$H$_4$N(CH$_3$)$_2$ | m-C$_6$H$_4$Br | OSO$_2$C$_6$H$_4$Br | KOC(CH$_3$)$_3$ | 83 | (CH$_3$)$_3$COH. |
| 6 | 4-OCH$_3$ | p-C$_6$H$_4$N(CH$_3$)$_2$ | p-C$_6$H$_4$CN | Cl | NaOC$_2$H$_5$ | 78 | C$_2$H$_5$OH. |
| 7 | 7-C$_6$H$_4$CH$_3$ | C$_6$H$_5$ | o-C$_6$H$_4$CH$_3$ | Br | NaH | 45 | Tetrahydrofuran. |
| 8 | 5-OH | p-C$_6$H$_4$NO$_2$ | o-C$_6$H$_4$OC$_2$H$_5$ | Br | NaOCH$_3$ | 80 | CH$_3$OCH$_2$CH$_2$OCH$_3$. |
| 9 | 6-NO$_2$ | m-C$_6$H$_4$CF$_3$ | o-C$_6$H$_4$CN | OSO$_2$C$_6$H$_5$ | Ba(OH)$_2$ | 65 | CH$_3$OH. |
| 10 | 5-N(CH$_3$)$_2$ | p-C$_6$H$_4$Cl | m-C$_6$H$_4$NO$_2$ | OSO$_2$CH$_3$ | Ba(OH)$_2$ | 65 | CH$_3$OH. |
| 11 | 5-CF$_3$ | o-C$_6$H$_4$Cl | p-C$_6$H$_4$SC$_3$H$_7$ | Br | NaH | 101 | Dioxane. |
| 12 | 6-SCH$_3$ | p-C$_6$H$_4$OCH$_3$ | o-C$_6$H$_4$OH | OSO$_2$C$_6$H$_4$CH$_3$ | Ba(OH)$_2$ | 65 | CH$_3$OH. |
| 13 | H | m-C$_6$H$_4$C$_2$H$_5$ | m-C$_6$H$_4$N(C$_2$H$_5$)$_2$ | Cl | KOH | 175 | (CH$_3$)$_2$NCHO. |
| 14 | H | p-C$_6$H$_5$N(CH$_3$)$_2$ | C$_6$H$_5$ | Br | KOH | 78 | C$_2$H$_5$OH. |
| 15 | H | C$_6$H$_5$ | p-C$_6$H$_5$N(CH$_3$)$_2$ | Br | KOH | 82 | (CH$_3$)$_2$CHOH. |
| 16 | H | p-C$_6$H$_4$CN | C$_6$H$_5$ | Br | NaOH | 78 | C$_2$H$_5$OH. |
| 17 | N(CH$_3$)$_2$ | C$_6$H$_5$ | C$_6$H$_5$ | Br | NaOH | 78 | C$_2$H$_5$OH. |

We claim:
1. Photochromic benzofuran compounds of the formula

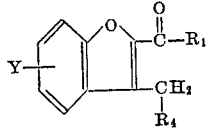

wherein $R_1$ and $R_4$ are selected from the group consisting of phenyl and substituted phenyl, said substituents for phenyl being selected from the group consisting of hy- References Cited by the Examiner

FOREIGN PATENTS 553,621   6/1957   Belgium.

OTHER REFERENCES

Sen et al.: Journal Indian Chemical Society, volume 35, No. 2, 1958, pp. 136–8.

ALEX MAZEL, *Primary Examiner.*

JAMES H. TURNIPSEED, *Assistant Examiner.*

UNITED STATES PATENT OFFICE
CERTIFICATE OF CORRECTION

Patent No. 3,321,491                           May 23, 1967

Kenneth Robert Huffman et al.

It is hereby certified that error appears in the above numbered patent requiring correction and that the said Letters Patent should read as corrected below.

Columns 3 and 4, TABLE I, third column, line 1 thereof, for $p\text{-}C_6H_4N(CH_3)_2$ read $p\text{-}C_6H_4SCH_3$ Signed and sealed this 26th day of December 1967.

(SEAL)
Attest:

Edward M. Fletcher, Jr.                         EDWARD J. BRENNER

Attesting Officer                                 Commissioner of Patents